United States Patent [19]

Sugimori et al.

[11] Patent Number: 5,146,327
[45] Date of Patent: Sep. 8, 1992

[54] ADDITION SIGNAL MULTIPLEXING APPARATUS FOR A TELEVISION SYSTEM

[75] Inventors: Yoshio Sugimori, Tokyo; Yoshihide Kimata, Machida; Yoshihiko Ogawa, Yokohama; Kiyoyuki Kawai, Yokosuka, all of Japan

[73] Assignees: Kabushiki Kaisha Toshiba, Kawasaki; Nippon Television Network Corporation, Tokyo, both of Japan

[21] Appl. No.: 598,626
[22] PCT Filed: Feb. 5, 1990
[86] PCT No.: PCT/JP90/00136
   § 371 Date: Oct. 11, 1990
   § 102(e) Date: Oct. 11, 1990
[87] PCT Pub. No.: WO90/09719
   PCT Pub. Date: Aug. 23, 1990

[30] Foreign Application Priority Data

Feb. 14, 1989 [JP] Japan ................................ 1-34427

[51] Int. Cl.⁵ .................. H04N 7/04; H04N 11/06; H04N 7/00
[52] U.S. Cl. ...................... 358/141; 358/12; 358/166
[58] Field of Search ............ 358/141, 12, 11, 36, 358/37, 166, 167

[56] References Cited

U.S. PATENT DOCUMENTS

| 4,551,754 | 11/1985 | Meise et al. | 358/180 |
| 4,631,584 | 12/1986 | Reitmeier | 358/141 |
| 4,748,496 | 5/1988 | Drury et al. | 358/12 |
| 4,839,720 | 6/1989 | Isnardi | 358/12 |

FOREIGN PATENT DOCUMENTS

| 55-38768 | 3/1980 | Japan | 358/140 |
| 0226883 | 9/1990 | Japan | |

Primary Examiner—James J. Groody
Assistant Examiner—Safet Metjahic
Attorney, Agent, or Firm—Cushman, Darby & Cushman

[57] ABSTRACT

The present invention is ingeniously conceived for a transmission system for a first television signal so as to enable a first television signal of a wide aspect screen to be transmitted in one channel and the transmitted television signal to be reproduced on a receiver of a conventional aspect screen. To this end, a screen dividing circuit (12) divides a wide aspect screen signal into a center panel signal and side panel signals. The center panel signal is supplied via a delay circuit (13) to an adder (16). The side panel signals are so allocated as to provide horizontal and vertical signals. The horizontal side signal is supplied via a horizontal overscan multiplexing circuit 16 to the adder (16) where it is multiplexed on a horizontal overscan area of the center panel signal. In the vertical overscan multiplexing circuit, the vertical side signal is time compressed and reverse processed for each line to provide it in a continuous form. The output of a vertical overscan multiplexing circuit (20) is supplied to a switch (18) where it is time division multiplexed on vertical overscan areas of the center panel signal which is sent from the adder (16) via a delay circuit (17).

4 Claims, 7 Drawing Sheets

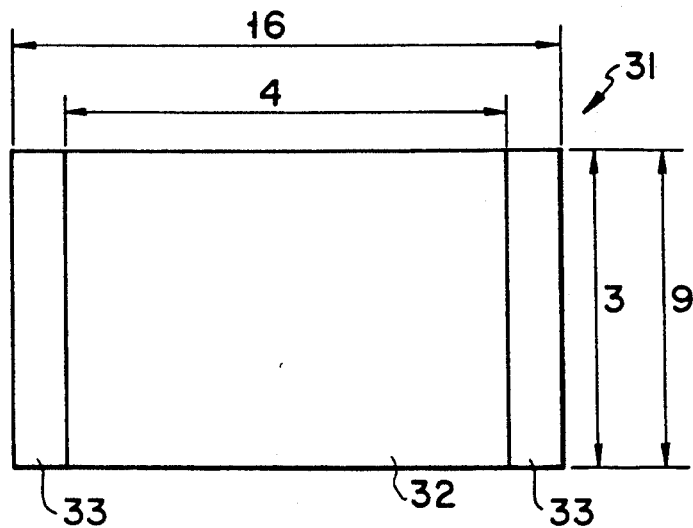
F I G. 2A
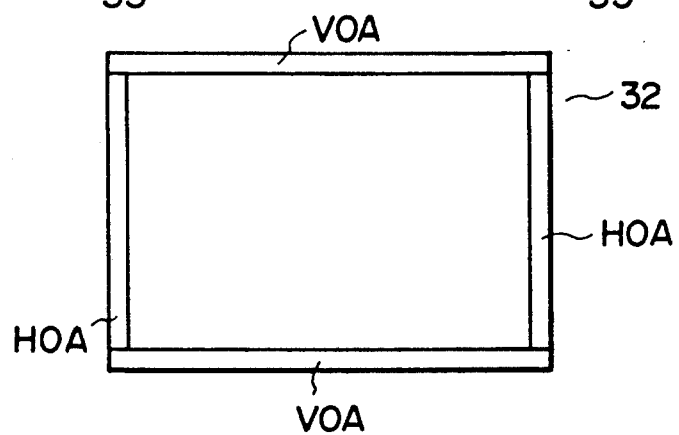
F I G. 2B
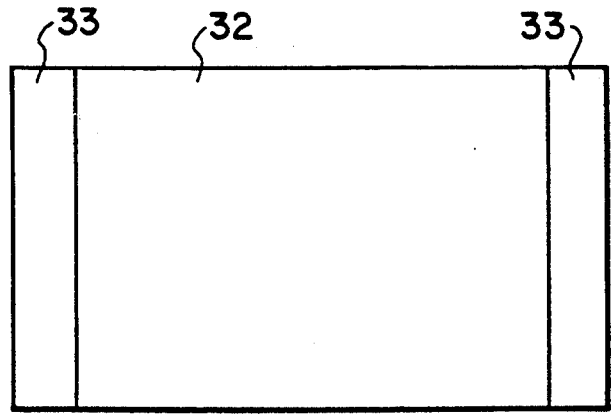
F I G. 4A

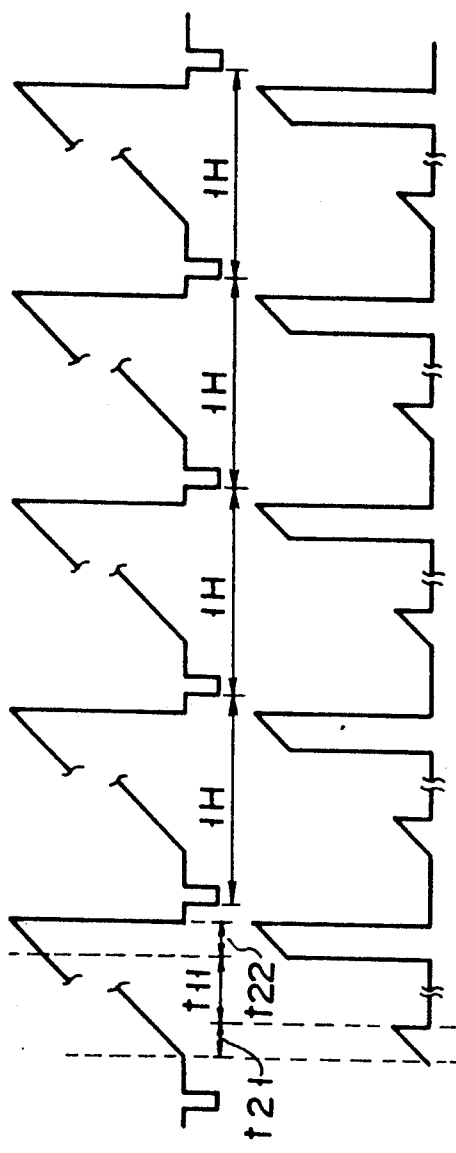
FIG. 4B
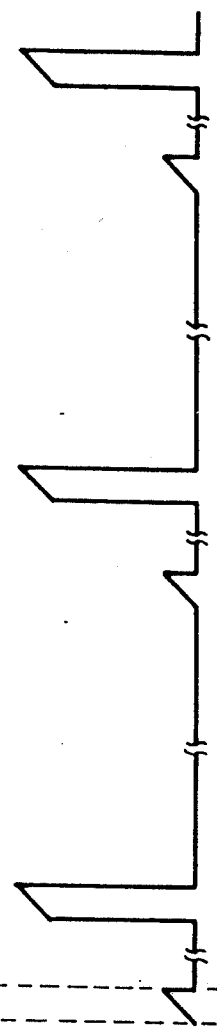
FIG. 4C
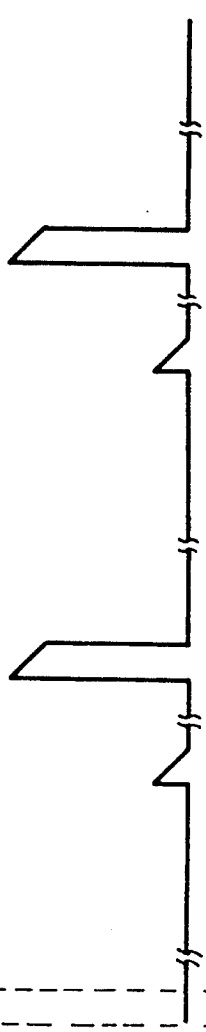
FIG. 4D TERMINAL 04X
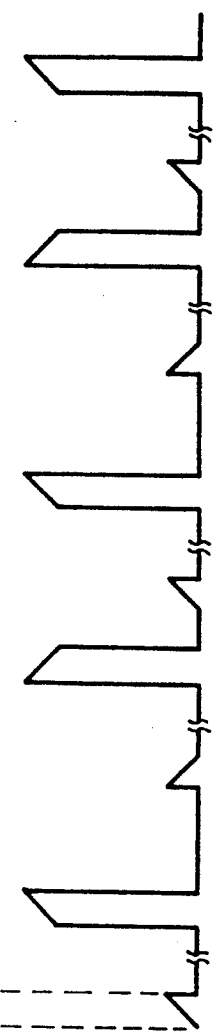
FIG. 4E TERMINAL 04Y
FIG. 4F SWITCH (204) OUTPUT

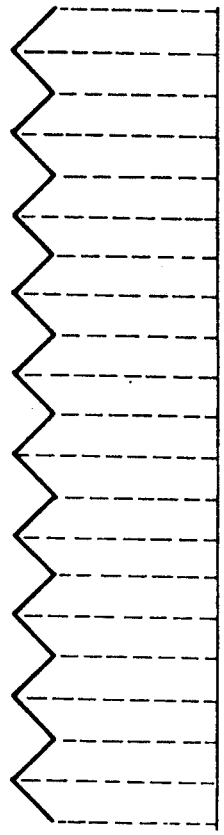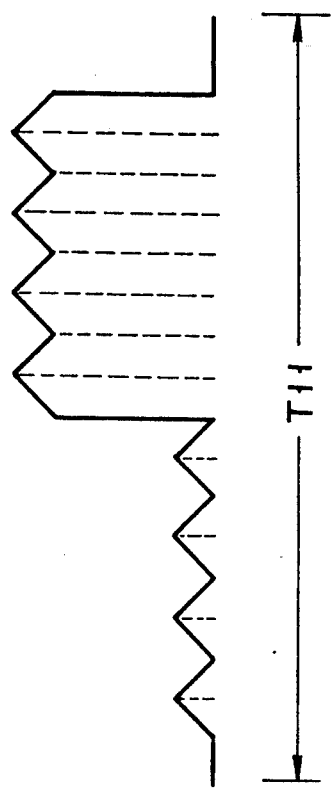
F I G. 5A
F I G. 5B
F I G. 5C

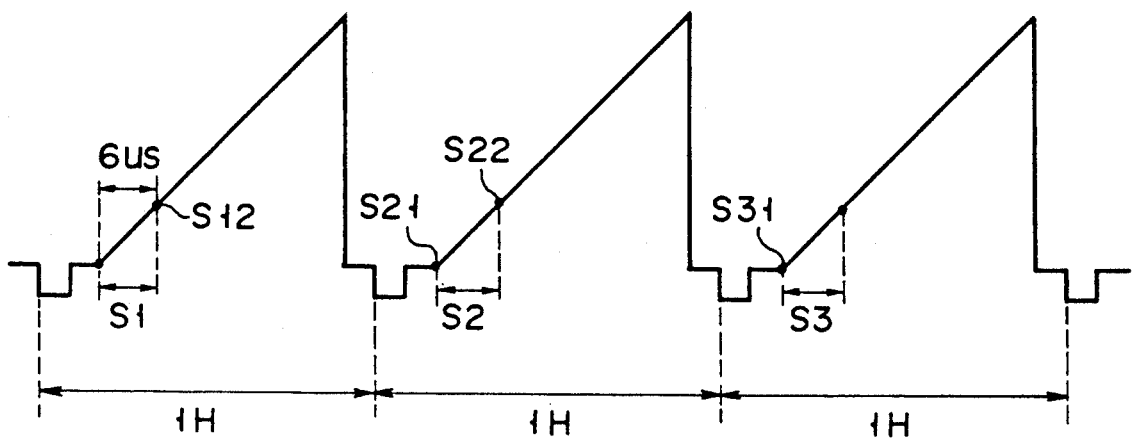
F I G. 6A
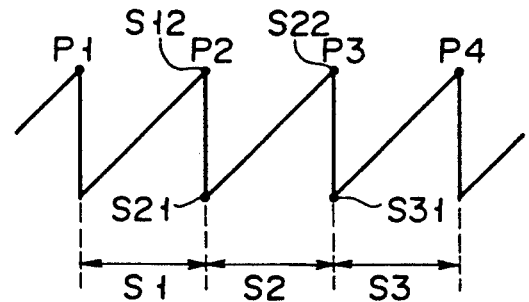
F I G. 6B
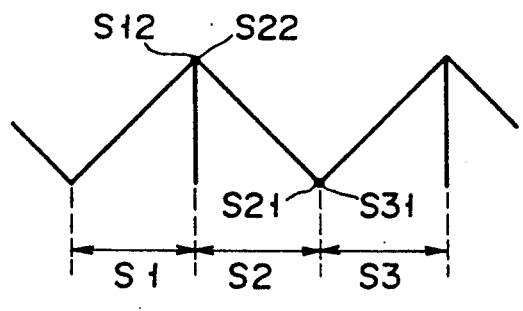
F I G. 6C

ADDITION SIGNAL MULTIPLEXING APPARATUS FOR A TELEVISION SYSTEM

TECHNICAL FIELD

The present invention relates to an addition signal multiplexing apparatus for a television system which achieves a signal transmission in a way to multiplex an addition signal which enlarges an aspect ratio on vertical overscan areas of a television signal.

BACKGROUND ART

In recent times a television broadcasting system has been developed which has an enlarged screen aspect ratio of 16:9. A television signal of a wide aspect ratio is hereinafter referred to as a wide aspect signal. A viewer's sense of presence can be enhanced on a wide aspect screen.

In order to achieve a wide aspect screen, it is necessary to consider a compatibility between a current television broadcasting system (aspect ratio of 4:3) signal and a wide aspect signal. Stated in another way, a new broadcasting system needs to be developed to reproduce a wide aspect signal even if being transmitted on a current television receiver.

A new broadcasting system has been developed which divides a wide aspect screen into a center panel and side panels, transmits a center panel signal (hereinafter referred to as a center signal) and side panel signal (hereinafter referred to as side signals) in separate channels, and reproduces two channel signals on a receiving side and assembles one wide aspect ratio signal. According to the new broadcasting system, if only a center signal's panel is employed, it is possible to receive and reproduce a center signal in the channel on a current television receiver.

However, this new system requires two channels for transmitting a wide aspect signal and tuners also on the receiving side for reception in two channels.

It is accordingly an object of this invention to provide an addition signal multiplexing apparatus for a television system which can transmit center and side signals in one channel with the side channels time division multiplexed on overscan areas of the center signal.

Another object of the present invention is to provide an addition signal mulplexing apparatus for a television system which, upon the time division multiplexing of side signals on overscan areas, multiplexes the side signals on the overscan areas of those fields proceeding relative to the field of a center signal corresponding to the side signal and, when the reproduction of the side signal has been completed, starts the reproduction on the screen of the center signal corresponding to the side signal to suppress an increase of a delay memory (hardware) on a decoder side.

Another object of the present invention is to provide an addition signal multiplexing apparatus for a television system which can transmit side signal information without leakage in which, when intermittently delivered side signals are joined in a continuous form and time division multiplexed on vertical overscan areas, the side signals are processed to enable a high correlative area of the side signal to be processed at the joined point of the side signal.

SUMMARY OF THE INVENTION

The present addition signal multiplexing apparatus comprises screen division means for allowing a first television signal representing a first screen of a first aspect ratio to be divided into a second television signal representing a second screen of a second aspect ratio smaller than the first aspect ratio and a third television signal representing a third screen which is obtained from subtracting the second screen from the first screen;

time division arranging means, supplied with the third television signal from the screen division means, for arranging third television signals into a continuous form;

delay means, supplied with the second television signal from the screen division means, for delaying the second television signal by an amount corresponding to at least one screen to control a transmission timing of the third television signal and corresponding second television signal, the delay means being adapted to start a display on the screen of the second television signal corresponding to a reproduction screen of the third television signal when the decoding of one screen area of the time division arranged third television signal has been completed on a receiving side; and means for multiplexing the time division arranged third television signal on vertical overscan areas of the delayed second television signal.

This arrangement can transmit the second and third television signals in one channel. The third television signal can be utilized as an addition signal for reproducing, for example, a wide aspect screen area.

Since the second television signal is delayed behind the third television signal, that is, the third television signal is precedent relative to the second television signal, the reproduction of the screen area by the second television signal is started when the decoding of the third television signal has been completed on the receiving side. Thus a hardware for delaying the second television signal can be decreased on the receiving side.

Further, according to the present invention, when the third television signals as intermittently delivered from respective lines of the first television signal is to be arranged in a continuous form, the present invention provides means for performing a time reversion for each line.

By so doing, the third television signal information can be transmitted without generating any high frequency component not transmittable at a joining point of the third television signals and can be done so without leakage.

BRIEF DESCRIPTION OF THE DRAWINGS

FIGS. 2A and 2B are explanatory views for explaining the operation of the present apparatus;

FIGS. 4A to 4F are explanatory views and waveform diagrams for explaining the operation of the present apparatus;

FIGS. 5A to 5C are signal waveform diagrams for explaining the operation of the present apparatus;

FIGS. 6A to 6C are signal waveform diagrams for explaining an effect of the present invention;

BEST MODE FOR CARRYING OUT THE INVENTION

Figure 1:
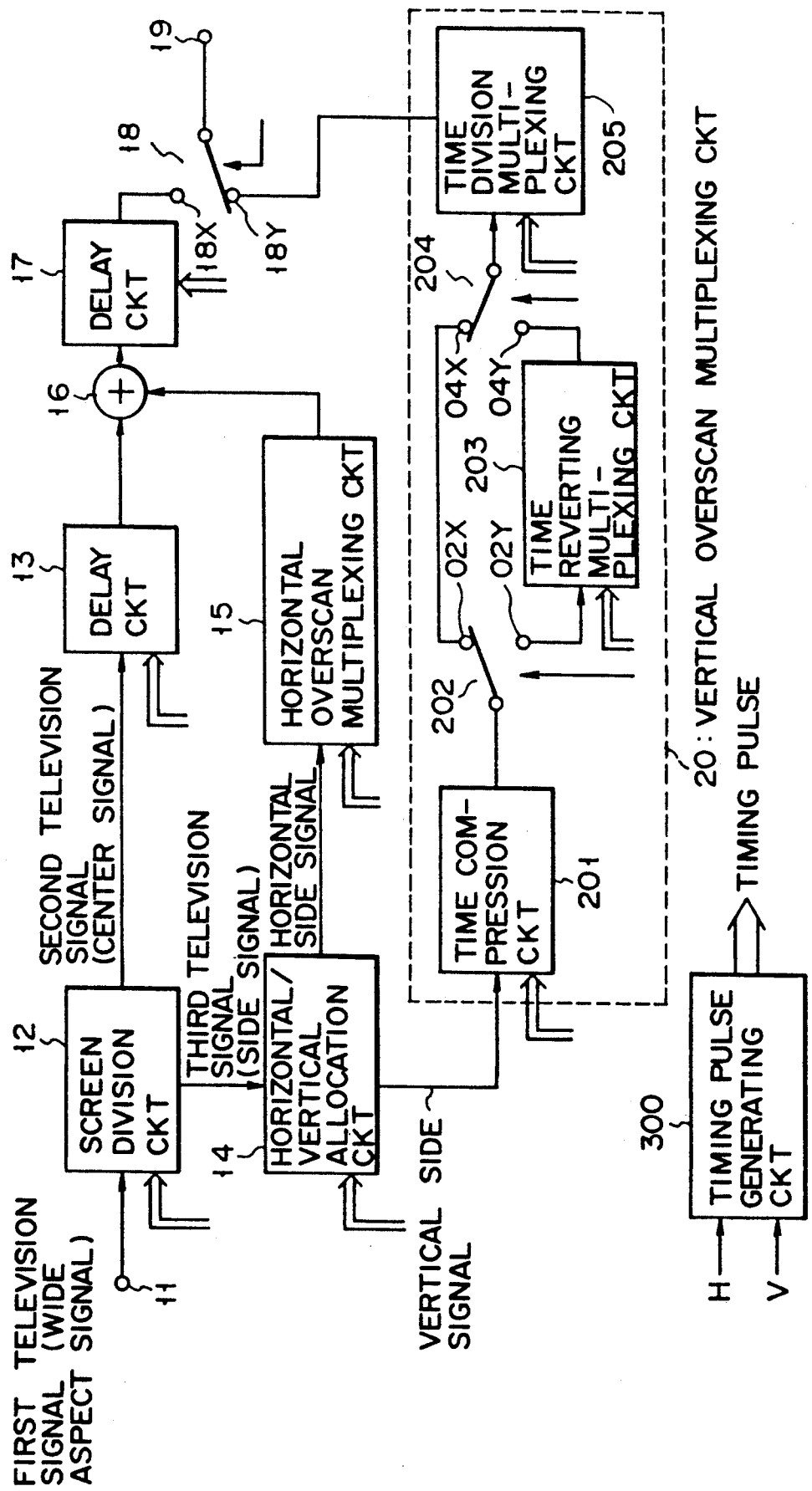
FIG. 1 is a circuit arrangement showing one embodiment of the present invention.

FIG. 1 shows one embodiment of the present invention. A first television signal is supplied to an input terminal 11. The first television signal is a wide aspect signal which allows a display on a screen of a wide aspect ratio of, for example, 16:9 (see FIG. 2A). The first television signal is supplied to a screen division circuit 12. The screen division circuit 12 divides a wide aspect signal into a second television signal (center signal) for a center panel and third television signals (side signals) for side panels. Upon taking out the center signal, the screen division circuit 12 does so, at an aspect ratio of 4:3, on a screen represented thereby.

A screen 31 as shown in FIG. 2A is a wide aspect screen, a panel 32 being a center panel (first panel) representable by the center signal and panels 33 being side panels (second panels) representable by side signals.

The center signal is delayed by a delay circuit 13 and supplied to an adder 16. The function of the delay circuit 13 will be set out below.

The side signal is supplied to a horizontal/vertical allocation circuit 14. The horizontal/vertical allocation circuit 14 separates the side signals, for example, frequency-wise to prepare a horizontal side signal multiplexed on horizontal overscan areas of the center signal and a vertical side signal multiplexed on vertical overscan areas of the center signal. The side signal is bandpass restricted to, for example, below 2.0 MHz, the horizontal side signal being below 0.8 MHz and vertical side signal being 0.8 to 2.0 MHz. The reason for the bandpass restriction of the side signal is because, in the event of the center signal's horizontal and vertical overscan areas multiplexing, it is possible to reduce an amount of information of a signal to be added.

The horizontal side signal is supplied to a horizontal overscan multiplexing circuit 15 and the vertical side signal is supplied to a vertical overscan multiplexing circuit 20.

The horizontal overscan multiplexing circuit 15 controls the output timing of the horizontal side signal so as to multiplex the horizontal side signal on the horizontal overscan areas of the center signal. The horizontal overscan areas correspond to right and left areas (HOA) in the panel, as shown in FIG. 2B, which is represented by the center signal.

In order to multiplex the vertical side signal on the vertical overscan areas of the center signal, the vertical overscan multiplexing circuit 20 processes the vertical side signal and controls its output timing. The vertical overscan areas are top and bottom areas (VOA) in the panel, as shown in FIG. 2B, which is represented by the center signal.

The horizontal side signal is multiplexed by the adder 16 on the horizontal overscan areas of the center signal. The output of the adder 16 is supplied through a delay circuit to one terminal 18X of a switch 18. The delay circuit 17 has the same delay amount as a whole delay time of the vertical overscan multiplexing circuit 20. The vertical overscan multiplexing circuit 20 supplies the vertical side signal to the other terminal 18Y of the switch 18. The switch 18 selects the terminal 18Y for the vertical overscan areas and the terminal 18X for the other areas.

A transmission television signal with the side signals multiplexed on the vertical and horizontal overscan areas emerges from an output terminal 19. A timing pulse generator 300 supplies a timing pulse to each associated circuit of the television system and switch in which case the horizontal and vertical synchronizing signals H and V separated from the wide aspect signal are used as reference signals.

The present apparatus is characterized in that the signal to be added is multiplexed on the vertical overscan areas in particular.

If the vertical side signal is multiplexed on the center signal, that side signal corresponding to the panel of the center signal is previously multiplexed on the vertical overscan areas of another center signal of a field preceding that of the center signal of interest.

FIGS. 3A to 3D sequentially show fields $F_{(n-1)}$, $F_{(n)}$, $F_{(n+1)}$, $F_{(n+2)}$, $F_{(n+3)}$ . . . , in vertical direction, of a transmission television signal. Areas (n-1)V1, (n-1)V2, (n)V1, (n)V2, (n+1)V1, (n+1)V2, (n+2)B1, (n+2)V2 show upper and lower vertical overscan areas of the respective fields.

Now attention is paid to the field $F_{(n+1)}$. The side signals corresponding to the center signal of the field $F_{(n+1)}$ are such that multiplexing is achieved among the lower vertical overscan area (n-1)V2 of the previous field, upper and lower vertical overscan areas (n)V1 and (n)V2 of the previous field $F_{(n)}$ and upper vertical overscan area (n+1)V1 of the field $F_{(n+1)}$ of interest. Therefore, it is followed that, when an image reproduction of the center signal of the field $F_{(n+1)}$ is started on the receiving side, the decoding of the side signal corresponding to the center signal has already been completed.

In order to transmit the side signal previously relative to the center signal present on the same screen on which said side signal exists, it is necessary to delay the center signal on the transmitting side. The delaying of the center signal is achieved by the delay circuit 13. If use is made of a side signal transmission system as set out in connection with FIGS. 3A to 3D, it is only necessary to provide the delay circuit 13 in one transmitter, that is, it is not necessary to provide a greater number of delay circuits in the receiver. This means that it is possible to alleviate a greater amount of hardware on the receiver.

Let it be assumed that the delay circuit 13 is not present. In this case, the side signal will not be previously transmitted relative to the corresponding center signal. In order to display the center signal and side signal simultaneously on the screen, it is necessary to delay and store the center signal on the receiver side until the decoding of the side signal is completed. The delaying of the center signal requires a memory of a greater capacity, so that a resultant receiver becomes highly expensive due to a greater amount of hardware on the receiver side. If, however, a previous side signal transmission system as set out above is employed, then the aforementioned problem is solved.

As set out above, the side signal corresponding to the center signal of the field $F_{(n+1)}$ is so formed that multiplexing is achieved among the vertical overscan area (n-1)V2, vertical overscan areas (n)V1, (n)V2 and vertical overscan area (n+1)V1. Stated in another way, the side signal corresponding to the center signal of one screen is so formed that the four vertical overscan areas are multiplexed on one another. This means that the vertical overscan areas corresponding to two fields are transmitted as a side signal corresponding to one field. Thus it is possible to, as a side signal corresponding to the center signal of the field $F_{(n+2)}$, again utilize that side signal employed in the field $F_{(n+1)}$. A third signal corresponding to a center signal of a field $F_{(n+3)}$, not shown, is so formed that multiplexing is achieved among vertical overscan areas $(n+1)V2$, $(n+2)V1$, $(n+2)V2$ and $(n+3)V2$, not shown.

In the aforementioned embodiment, a time compression circuit 201 is provided in the vertical overscan multiplexing circuit 201, the reason of which will be set out below.

In the NTSC system, for example, about 480 lines are allocated for an effective scanning area of each frame with about 15 lines, for example, allocated relative to upper and lower vertical overscan areas. Then it follows that the effective scanning area is about 240 lines for one field and that about 7 lines are present for a vertical overscan area. This means that about 30 lines are present for four vertical overscan areas as viewed in terms of one field. In order that a side signal as extracted from a wide aspect signal (240 lines) may be contained in a transmission signal (30 lines), it is only necessary that, in view of a relation of $8 \times 30 = 240$, the side signals corresponding to eight lines be multiplexed on one continuous line of a transmission signal. If, however, a side signal corresponding to eight lines is allocated to one line of a transmission signal, the frequency of a resultant multiplexed signal is increased, producing a higher component than a transmittable frequency bandpass component (about 4.0 MHz). In the present embodiment, the vertical side signal is bandpass restricted to below 2.0 MHz and then time compressed. By so doing, side signals corresponding to eight lines are ingeniously multiplexed on one line of a transmission signal.

If, in the present embodiment, an interruptedly extracted side signal is to be time division arranged into a continuous signal, a side signal is so processed as to have a highly correlated area joined thereto at a joining point in a manner to be multiplexed on the vertical overscan areas. For this reason, a means is provided for achieving time division multiplexing with a time reverted for each line in the case where vertical side signals as extracted from respective lines of a first television signal are arranged in a continuous form. By so doing, the system can transmit side signal information without leakage. The vertical overscan multiplexing circuit 20 realizes such a function as set out above.

The vertical overscan multiplexing circuit 20 includes the time compression circuit 201 to which the vertical side signal is supplied. The time compression circuit 201 samples the vertical side signal for time compression, that is, performs a time compression such that the side signal corresponding to one field as set out above can be multiplexed on the four vertical overscan areas. The output of the time compression circuit 201 is supplied to a switch 202. The switch 202 selects its terminal 02X and 02Y for each one horizontal period. The terminal 02X is connected to a terminal 04X of a switch 204 and the terminal 02Y is connected to a time reverting multiplexing circuit 203. The time reverting multiplexing circuit 203 has its input signal waveform time-reverted and supplies a time-reverted output to a terminal 04Y of the switch 204. The switch 204 is so controlled that the side signals of the respective lines are alternately selected and supply the time-reverted output to a time division multiplexing circuit 205.

FIG. 4 shows a process involved from the processing of the vertical side signal to the supply of it to the time division multiplexing circuit 205, noting that, in FIG. 4, the process includes a "time compression" concept for the sake of an explanation. FIG. 4A shows a position of a wide aspect panel 31 and those of side panels 33. FIG. 4B shows, in a wide aspect signal, a center signal interval t11 corresponding to the panel 32 and side signal intervals t21, t22 corresponding to panels 33. Since vertical side signals are extracted as signals corresponding to intervals t21 and t22, they are as shown in FIG. 4C. Since the switch 202 is switched for each one horizontal line, a signal as shown in FIG. 4D emerges from the terminal 04X of the switch 204 and a side signal of each one horizontal line as shown in FIG. 4E emerges, as a time-reverted signal, from the terminal 04Y of the switch 204. As a result, a side signal as shown in FIG. 4F is obtained from the output terminal of the switch 204.

The signal as shown in FIG. 4F is input to the time division multiplexing circuit 205 to provide left and right side signals in a continuous form.

FIG. 5A and 5B show the side signals corresponding to right and left panels as input to the time division multiplexing circuit 205. The time division multiplexing circuit 205 samples an output of the switch 204 and allows it to be stored in a continuous serial array in another memory operated in synchronism with, for example, right and left side signals. Further, the time division multiplexing circuit 205 produces a continuous eight-line right side signal and a subsequent continuous serial side signal, for example, as shown in FIG. 5C upon reading a signal to be multiplexed on the vertical overscan areas. A time period T11 in FIG. 5C corresponds to one horizontal line period of a transmitting signal, that is, one horizontal line period of the vertical overscan areas. In FIG. 5C, the multiplexing of the left and right side signals is achieved in the preceding and following halves, respectively, of one horizontal line period of the vertical overscan areas. However, the present invention is not restricted to the use of the multiplexing as set out above. Of four vertical overscan areas, it is possible to achieve the multiplexing of the two left side signals and of the remaining two right side signals.

FIG. 6 is a view for explaining an effect of the vertical overscan multiplexing circuit 20. FIG. 6A shows the positions of left side signals S1 . . . S3 for ease in explanation.

FIG. 6B shows a signal waveform with the left side signal multiplexed in time division fashion without being time reversed. Here, P1, P2, P3 and P4 show joining points for the side signals taken out of the wide aspect signal. Explained in connection with the joining point P2, as a representative example, the joining point P2 is originally a place at which a join is made between the vertical side signals S1 and S2 having a horizontal distance of about 6 $\mu$s and vertical distance of one horizontal line. As appreciated from the above, there is no vertical correlation at all between a position S12 of the side signal S1 and a position S21 of the side signal S2, that is, there is a horizontal shift of about 6 $\mu$s between the position S12 of the side signal S1 and the position S21 of the side signal S2 upon being compared between the upper and lower lines by referring to FIG. 6A. In the case where an uncorrelated portion is connected between the lines, a high frequency component which cannot be transmitted in a transmission band of the television signal is created at a joining point P2. Put it in another way, an abrupt change arises at that joining point between the side signals S1 and S2. Since that high frequency component is not transmitted to the receiver side, it is not possible to exactly reproduce an original waveform of the vertical side signals S1 and S2 on the receiver side. As a result, a poor image quality emerges at the joining point between the center panel and the side panels, so that the joining point is visually recognized from a viewer.

In the present embodiment, the side signals S1, S2 and S3 are time reversed for every other line as shown in FIG. 6C, that is, the position S12 of the side signal S1 is joined to a position S22 of the side signal and a position S21 of the side signal S2 is joined to a position S31 of the side signal S3. With these side signals so arranged, a very high signal is connected at each joining point. This will be appreciated if the signal of each line is arranged in a vertical direction.

By so doing, a better continuity is obtained for the side signals, never producing such high harmonic components as set out in connection with the signal in FIG. 6B. It is thus possible to transmit the side signal without leakage. In the receiving side, the inherent waveform of the vertical side signals S1 and S2 can exactly be reproduced, thus improving an image quality at a joining points between the center panel and the side panels.

Figure 7:
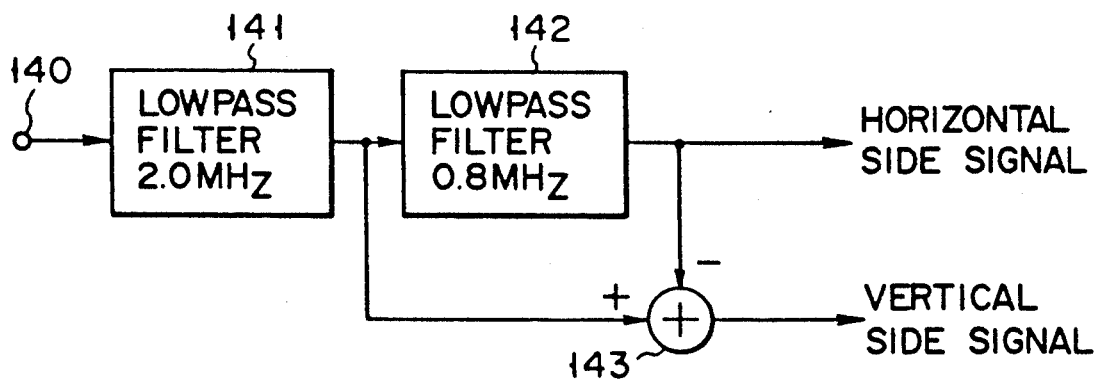
FIG. 7 is a practical circuit showing a horizontal/vertical allocation circuit shown in FIG. 1.

FIG. 7 shows a detailed arrangement of the horizontal/vertical allocation circuit 14.

The side signal which is supplied from the image division circuit 12 is fed via a terminal 140 to a lowpass filter 141 which allows the passage of a 2.0 MHz component. The output of the lowpass filter 141 is supplied to a subtracter 143 and to a lowpass filter 142 which allows the passage of a 0.8 MHz component. The output of the lowpass filter 142 is supplied to the subtracter 143 and as a horizontal side signal to a horizontal overscan multiplexing circuit 15. The output of the subtracter 143 is supplied as a vertical side signal to the vertical overscan multiplexing circuit 20.

The present invention is not restricted to the aforementioned embodiment.

Figure 8:
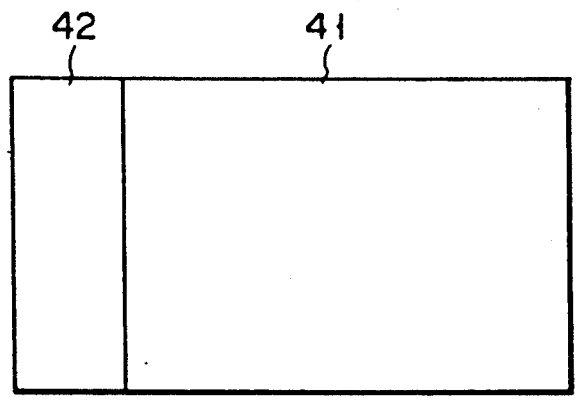
FIG. 8 is a explanatory view showing another embodiment of the present invention.

Although in the aforementioned embodiment the wide aspect screen has been explained as being divided into the center signal and left and right signals with the side signals multiplexed on the horizontal and vertical overscan areas, the division direction of the wide aspect screen is not restricted thereto. As shown in FIG. 8, the screen may be divided into main screen 41 and sub-screen 42 in which case the signal for the sub-screen 42 is multiplexed on the horizontal and vertical overscan areas.

Figure 3A:
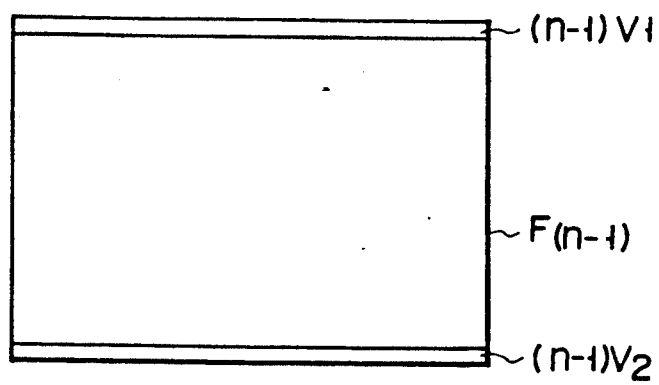
FIGS. 3A to 3D are explanatory views for explaining the operation of the present apparatus.
Figure 3B:
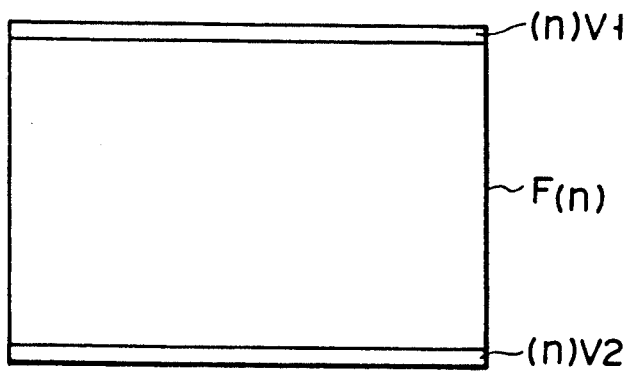
Figure 3C:
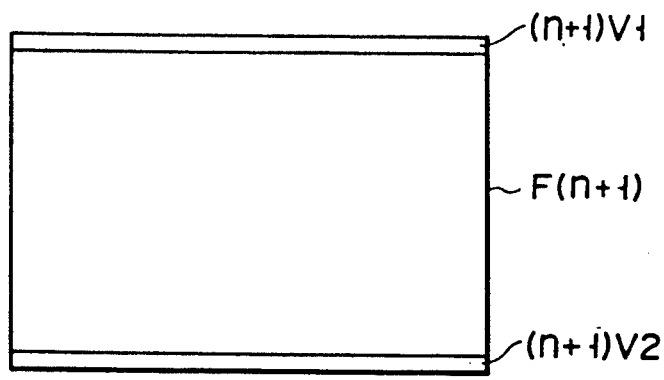
Figure 3D:
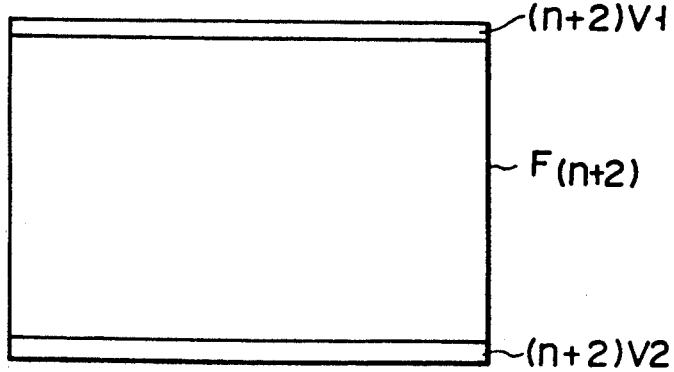

Although, upon the multiplexing of the side signals on the vertical overscan areas in the aforementioned embodiment, the upper vertical overscan area (n+1)V1 of the center signal $F_{(n+1)}$ as shown in FIG. 3C has been explained as being such that the side signal corresponding to the center signal $F_{(n+1)}$ is multiplexed on the vertical overscan areas (n-1)V2, (n)V1, (n)V2 and (n+1)V1, the side signal corresponding to the center signal F(n+1) may be such that it is multiplexed on the vertical overscan areas (n-1)V1, (n-1)V2, (n)V1, (n)V2 and (n+1)V. Therefore, the delay time of the delay circuit 13 is not restricted to the aforementioned embodiment.

Although in the aforementioned embodiment the present invention has been explained in connection with the apparatus for transmitting the side signals for a wide aspect-ratio screen, it is not restricted thereto. The present apparatus can also be applied to the transmission of an addition signal for various objects, with the use of the vertical overscan area of a transmitting television signal.

According to the present invention, as set out above, it is possible to enhance a reproduction capacity of the addition signal and hence to reduce the receiver's hardware.

Industrial Applicability

The present invention can be applied to a system for transmitting and receiving a television signal. For example, an electromagnetic wave, cable and optical fiber are employed as a means for transmitting such a television signal. The present apparatus can also be applied to a system for recording and reproducing a television signal on and from a recording medium. Further, the present apparatus can be applied to a monitoring apparatus utilizing a television system.

We claim:

1. An addition signal multiplexing apparatus for a television system, characterized by comprising:

screen division means for allowing a first television signal representing a first screen of a first aspect ratio to be divided into a second television signal representing a second screen of a second aspect ratio smaller than the first aspect ratio and a third television signal representing a third screen which is obtained by subtracting the second screen from the first screen;

time division arranging means, supplied with the third television signal intermittently taken by the screen division means from each line of the first television signal, for time reversing the third television signal for each line to time division arrange into a continuous form; and means, supplied with the time division third television signal and second television signal, for achieving the multiplexing of the time division arranged third television signal on vertical overscan areas of the second television signal.

2. An addition signal multiplexing apparatus for a television system, characterized by comprising:

screen dividing means for allowing a first television signal representing a first screen of a first aspect ratio to be divided into a second television signal having a second screen of a second aspect ratio smaller than the first aspect ratio and a third television signal representing a third screen which is obtained by subtracting the second screen from the first screen;

time division arranging means, supplied with the third television signal intermittently taken by the screen dividing means from each line of the first television signal, for time reversing the third television signal for each line to time division arrange into a continuous form;

delay means, supplied with the second television signal from the screen dividing means, for delaying the second television signal by an amount corresponding to at least one screen to control a transmission timing of the third television signal and corresponding second television signal, the delay means being adapted to start a display on the screen of the second television signal corresponding to a reproducing screen of the third television signal when the decoding of one screen area of the time division arranged third television signal has been completed; and means for multiplexing the time division arranged third television signal on vertical overscan areas of the delayed second television signal.

3. An addition signal multiplexing apparatus as recited in claim 2 characterized in that a third signal from said screen dividing means is restricted to a bandpass range of below 2.0 MHz.

4. An addition signal multiplexing apparatus according to claim 3, characterized in that said time division arranging means includes a time compression circuit for time compressing an incoming third television signal from said screen dividing means.

* * * * *